US010699275B2

(12) United States Patent
Allen et al.

(10) Patent No.: US 10,699,275 B2
(45) Date of Patent: Jun. 30, 2020

(54) SYSTEMS AND METHODS FOR USE IN AUTHORIZING TRANSACTIONS TO ACCOUNTS

(71) Applicant: MASTERCARD INTERNATIONAL INCORPORATED, Purchase, NY (US)

(72) Inventors: John Allen, Wicklow (IE); Dawid Nowak, Dublin (IE); Vladut Druta, Dublin (IE)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 311 days.

(21) Appl. No.: 15/615,740

(22) Filed: Jun. 6, 2017

(65) Prior Publication Data

US 2018/0349909 A1    Dec. 6, 2018

(51) Int. Cl.
*G06Q 20/08* (2012.01)
*G06Q 20/40* (2012.01)
*G06Q 20/10* (2012.01)
*H04L 29/08* (2006.01)
*G06Q 20/34* (2012.01)

(52) U.S. Cl.
CPC ..... *G06Q 20/40145* (2013.01); *G06Q 20/085* (2013.01); *G06Q 20/102* (2013.01); *G06Q 20/35785* (2013.01); *G06Q 20/405* (2013.01); *H04L 67/306* (2013.01)

(58) Field of Classification Search
CPC .................. G06Q 20/085; G06Q 20/35785
USPC .................................................. 705/39
See application file for complete search history.

(56) References Cited

U.S. PATENT DOCUMENTS

| 2005/0165684 | A1* | 7/2005 | Jensen | G06Q 20/00 705/44 |
| 2012/0330784 | A1* | 12/2012 | Nahidipour | G06Q 20/3278 705/26.41 |
| 2015/0088756 | A1* | 3/2015 | Makhotin | G06Q 20/3829 705/71 |
| 2015/0348185 | A1* | 12/2015 | Frost | G06Q 40/02 705/35 |

* cited by examiner

*Primary Examiner* — Jessica Lemieux
(74) *Attorney, Agent, or Firm* — Harness, Dickey & Pierce, P.L.C.

(57) ABSTRACT

Systems and methods are provided for use in processing transactions to payment accounts by transacting users, based on authentication of designated users associated with the payment accounts. One exemplary method includes receiving, at a computing device, a message associated with a transaction to a payment account where the transaction is initiated by a first user, and retrieving an authorization profile for the payment account based on a primary account number for the payment account. The authorization profile includes an indication of a communication device associated with a second, designated user also associated with the payment account. The method also includes soliciting, by the computing device, from the first user, a selection of the communication device and then, in response, transmitting an authentication request for the transaction to the second user at the communication device, thereby permitting the second user to grant permission for the transaction to the payment account.

20 Claims, 4 Drawing Sheets

SYSTEMS AND METHODS FOR USE IN AUTHORIZING TRANSACTIONS TO ACCOUNTS

FIELD

The present disclosure generally relates to systems and methods for use in authorizing purchase transactions to payment accounts, and in particular, to systems and methods for use in seeking permission for the purchase transactions from authorizing users for the payment accounts at associated communication devices, whereupon transacting users performing the purchase transactions are able to proceed in the transactions (regardless of whether the transacting users are also the authorizing users of the payment accounts or are other users of the payment accounts).

BACKGROUND

This section provides background information related to the present disclosure which is not necessarily prior art.

Consumers often use payment accounts to purchase products (e.g., goods and services, etc.) from merchants. The payment accounts may include credit, debit or prepaid types of accounts. When using such payment accounts to make purchases (broadly, to perform purchase transactions), the consumers associated with the payment accounts, or other users, are often authenticated to the payment accounts through signatures, personal identification numbers (PINs), biometrics, or otherwise, as being authorized users of the payment accounts. Once authenticated, regardless of the manner, the purchases are permitted to proceed, with payment networks involved in processing the purchases and/or issuers of the payment accounts either approving and/or declining the purchases. The purchases may be declined, for example, when insufficient funds/credit are associated with the payment accounts, when payment devices associated with the payment accounts have been reported missing/stolen, or based on one or more parameters of the purchases themselves (e.g., based on locations, purchase amounts, etc.).

DRAWINGS

The drawings described herein are for illustrative purposes only of selected embodiments and not all possible implementations, and are not intended to limit the scope of the present disclosure.

Figure 1:
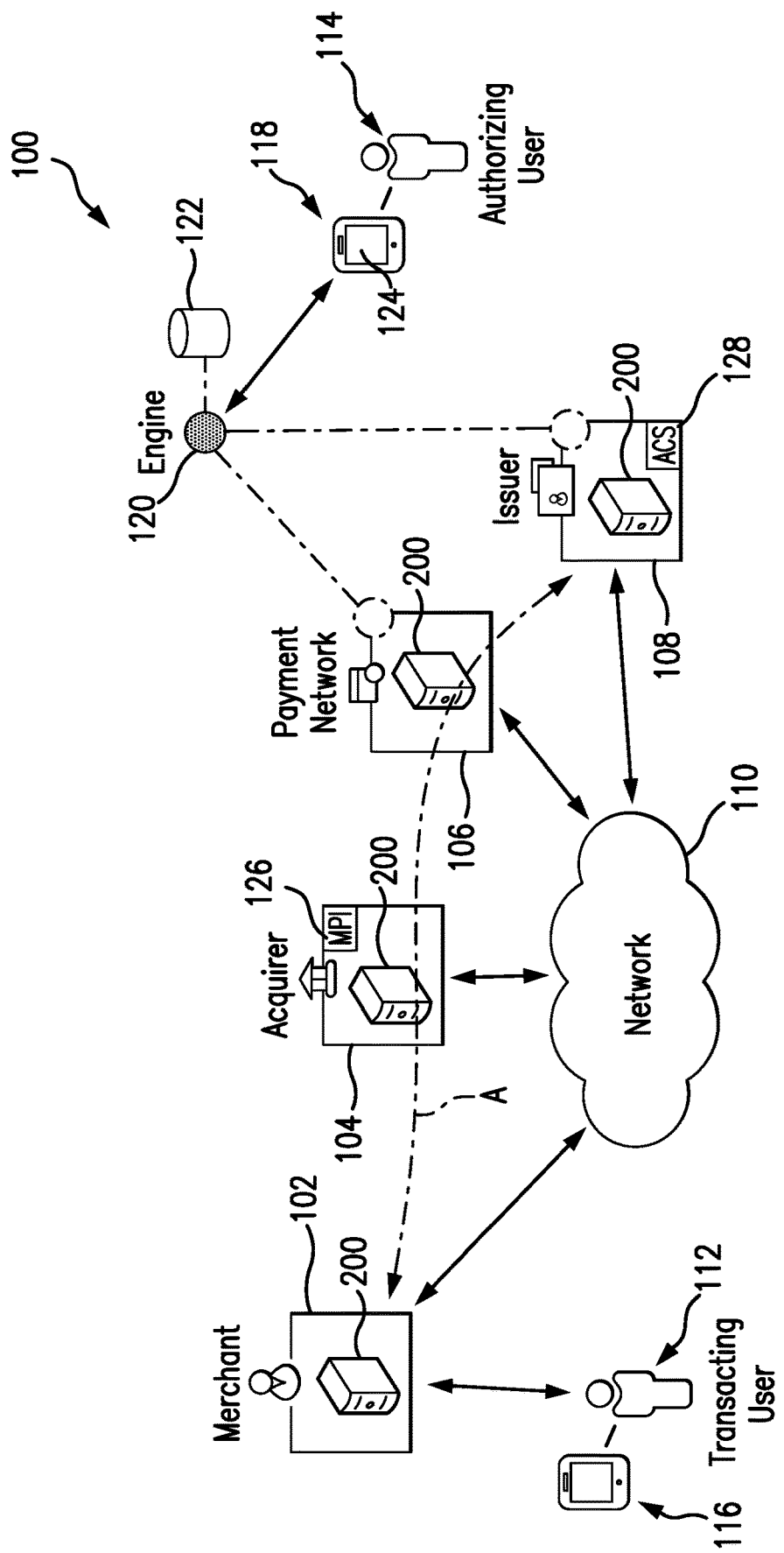
FIG. 1 is a block diagram of an exemplary system of the present disclosure suitable to permit authorizing users to provide permission for purchase transactions to payment accounts performed by transacting users, on per transaction bases.
Figure 3:
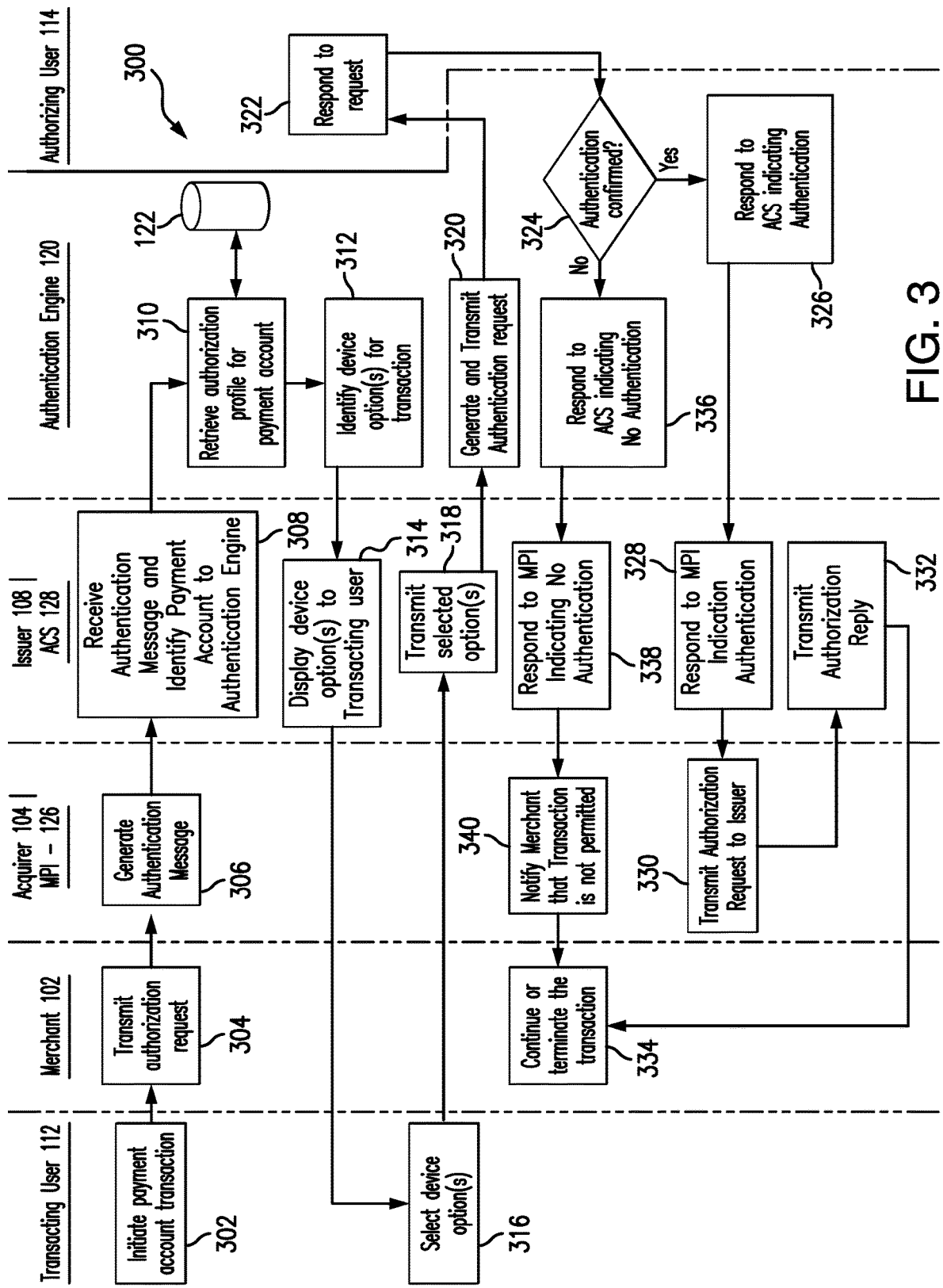
Figure 4:
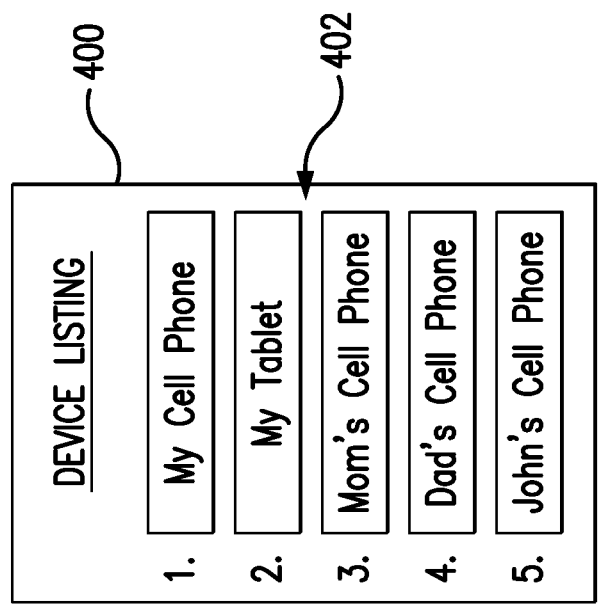

FIG. 3 is an exemplary method that may be implemented in the system of FIG. 1 for use in permitting a transacting user to fund a purchase transaction with a payment account, upon permission from an authorizing user associated with the payment account at a communication device associated with the authorizing user; and FIG. 4 is an exemplary interface illustrating example device options for a transacting user to request permission from an authorizing user for a purchase transaction to a payment account associated with the authorizing user, which may be implemented in the system of FIG. 1 and/or the method of FIG. 3.

Corresponding reference numerals indicate corresponding parts throughout the several views of the drawings.

DETAILED DESCRIPTION

Exemplary embodiments will now be described more fully with reference to the accompanying drawings. The description and specific examples included herein are intended for purposes of illustration only and are not intended to limit the scope of the present disclosure.

Payment accounts are often used by consumers (broadly, users) to fund purchase transactions for products (e.g., goods and/or services, etc.) at merchants. The payment accounts may be associated with single users (e.g., single consumers, etc.), or they may be associated with multiple users. Uniquely, the systems and methods herein provide for authentication and/or permission messages to be transmitted to authorizing users of payment accounts, for each of the transactions performed using the payment accounts, requesting that the authorizing users permit, or not, the transactions. In particular, an authentication engine is configured to determine that a purchase transaction to a payment account has been attempted (or requested) by a transacting user, or is forthcoming, whereupon the authentication engine provides the transacting user with options for requesting permission for the transaction from an authorizing user of the payment account, based on an authorization profile for the payment account. The response from the transacting user then determines/identifies the authorizing user (i.e., determines the transacting user as the authorizing user, or determines another user as the authorizing user) and/or an associated communication device from which permission for the transaction should be provided/received (i.e., as selected from the authorization profile). Then, when the purchase transaction is permitted, by the authorizing user at the identified communication device, the authentication engine confirms the permission and communicates with an issuer and/or a merchant to enable the transaction to proceed (e.g., to then allow the issuer to approve an authorization request for the transaction in a generally conventional manner, etc.). In this way, the authentication engine enables multiple different users to potentially perform purchase transactions to the same payment accounts while allowing authorizing users of the payment accounts to still maintain control over which purchase transactions are actually permitted. In connection therewith, the authentication engine provides for an additional layer of authentication and/or authorization to the purchase transactions, by the authorizing users, prior to the transactions being completed.

FIG. 1 illustrates an exemplary system 100, in which the one or more aspects of the present disclosure may be implemented. Although the system 100 is presented in one arrangement, other embodiments may include systems arranged otherwise depending, for example, on the manner in which transactions are authorized, on the manner in which users are authenticated, etc.

The system 100 generally includes a merchant 102, an acquirer 104 associated with the merchant 102 (and configured to process purchase transactions performed at the merchant 102), a payment network 106, and an issuer 108 configured to issue payment accounts to consumers (broadly, users), each coupled to (and in communication with) network 110. The network 110 may include, without limitation, a local area network (LAN), a wide area network (WAN) (e.g., the Internet, etc.), a mobile network, a virtual network, and/or another suitable public and/or private network capable of supporting communication among two or more of the parts illustrated in FIG. 1, or any combination thereof. For example, the network 110 may include multiple different networks, such as a private payment transaction network made accessible by the payment network 106 to the acquirer 104 and the issuer 108 and, separately, the public Internet, which is accessible as desired to the merchant 102, the acquirer 104, and the issuer 108, etc.

The merchant 102 is configured to offer and sell products (e.g., goods, services, etc.) to consumers including, for example, the transacting (or purchasing) user 112. The products may include any suitable and/or desired products within the scope of the present disclosure. In connection therewith, the merchant 102 is generally associated with one or more physical locations and/or virtual locations (e.g., websites, etc.), through which the products are offered for sale and/or sold to the consumers.

In the exemplary embodiment, the transacting user 112 is associated with an authorizing user 114. In general, the transacting user 112 and the authorizing user 114 are subject to one or more relationships, such as, for example, a child-parent relationship, a dependent-guardian relationship, an employee-employer relationship, etc., whereupon one user in the relationship (e.g., the authorizing user 114, etc.) may exercise some measure of control, oversight, advisement, and/or instruction over the other user in the relationship (e.g., the transacting user 112, etc.) relating to one or more personal, financial, professional, etc. aspects. Also in the exemplary embodiment, the authorizing user 114 is associated with a payment account issued to the user 114 by the issuer 108. The payment account may be used, by the authorizing user 114, to fund purchase transactions for products from the merchant 102, and other merchants. In addition, the authorizing user 114 permits the transacting user 112 to access and/or use the payment account to fund purchase transactions for products (e.g., as an authorized user, etc.), subject to the authorization/permission described below (e.g., subject to certain rules, restrictions, authentications, etc.).

With that said, in a conventional transaction, when the authorizing user 114 desires to purchase a product from the merchant 102, the user 114 presents a payment device associated with his/her payment account to the merchant 102 to initiate a purchase transaction for the product. In connection with this example transaction, the merchant 102 receives and/or retrieves credentials for the consumer's payment account from the payment device, for example, via a point-of-sale (POS) terminal, and communicates an authorization request for the transaction to the acquirer 104 through the network 110 (along path A in FIG. 1, as is conventional). In turn, the acquirer 104 communicates the authorization request with the issuer 108, through the payment network 106 (again via the network 110), for authorization of the transaction (e.g., to determine if the user's payment account is in good standing and if there is/are sufficient credit/funds to complete the transaction, etc.). If the issuer 108 accepts the transaction, an authorization reply is provided back to the merchant 102 (again, generally along path A) approving the transaction, and the merchant 102 is then able to proceed in the transaction. The transaction is later cleared and settled by and between the merchant 102 and the acquirer 104 and by and between the acquirer 104, the payment network 106, and the issuer 108 (in accordance with settlement arrangements, etc.). Conversely, if the issuer 108 declines the transaction, an authorization reply is provided back to the merchant 102 declining the transaction, and the merchant 102 is able to terminate the transaction with the user 112, or request an alternate form of funding.

Transaction data is generated, collected, and stored as part of the above interactions among the merchant 102, the acquirer 104, the payment network 106, the issuer 108, and the user 112. The transaction data represents at least a plurality of transactions, for example, completed transactions, attempted transactions, etc. The transaction data, in this exemplary embodiment, is stored at least by the payment network 106 (e.g., in a data structure associated with the payment network 106, etc.). Additionally, or alternatively, the acquirer 104 and/or the issuer 108 may store the transaction data, or part thereof, in a data structure. The transaction data may be stored in any desired manner in the system 100. With that said, transaction data may include, for example, payment account numbers (e.g., primary account numbers (PANs), etc.), amounts of transactions, merchant IDs, merchant category codes (MCCs), region codes for merchants involved in transactions and/or POS terminals associated with the merchants (or other merchant location identifiers and/or transaction location identifiers), merchant DBA names, dates/times of transactions, products purchased and related descriptions or identifiers thereof, etc. It should be appreciated that more or less information related to transactions, as part of either authentication of consumers, authorization and/or clearing and/or settling, may be included in transaction data and stored within the system 100, at the merchant 102, the acquirer 104, the payment network 106, and/or the issuer 108. Further, data unrelated to particular payment accounts may be collected by a variety of techniques, and similarly stored within the system 100.

In various exemplary embodiments, users involved in the different transactions/interactions herein are prompted to agree to legal terms associated with their payment accounts, for example, during enrollment in their accounts, upon installation of related applications to their communication devices, etc. In so doing, the users may voluntarily agree, for example, to allow issuers of their payment accounts, payment networks configured to process purchase transactions to their payment accounts, etc., to use data collected during enrollment and/or collected in connection with processing the transactions, subsequently, for one or more of the different purposes described herein.

With continued reference to FIG. 1, the transacting user 112 and the authorizing user 114 are associated with respective communication devices 116 and 118. The communication devices 116 and 118 may include, for example, smartphone, laptops, tablets, etc. Often, though, at least the communication device 118 will include a portable communication device, so that the communication device 118 is located with and/or carried with the authorizing user 114, for use as described herein.

While only two users 112 and 114 are shown in the system 100 in FIG. 1, it should be appreciated that a different number of users may be included in other system embodiments. In addition, it should be appreciated that multiple transacting users may be associated with the authorizing user 114, and that the transacting user 112 may be associated with multiple different authorizing users. Similarly, while only one merchant 102, one acquirer 104, one payment network 106, and one issuer 108 are illustrated, it should be appreciated that any number of these entities (and their associated components) may be included in the system 100, or may be included as a part of systems in other embodiments, consistent with the present disclosure.

Figure 2:
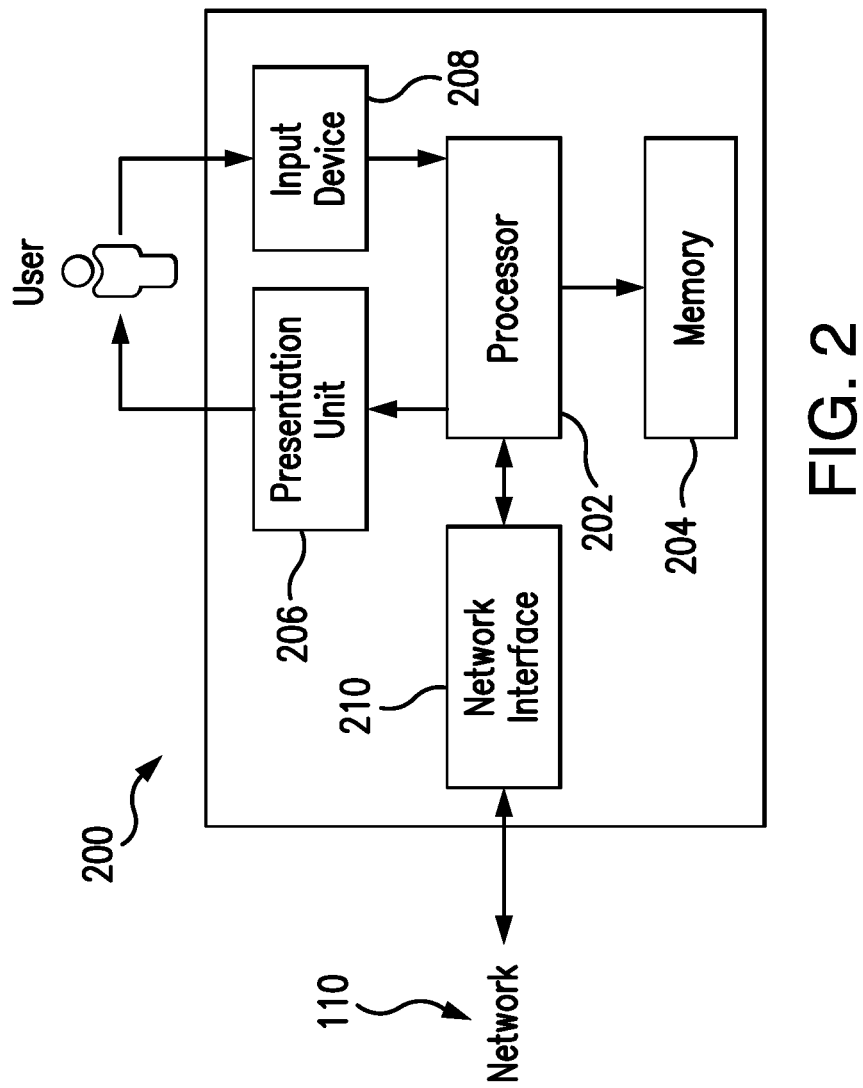
FIG. 2 is a block diagram of a computing device that may be used in the exemplary system of FIG. 1.

FIG. 2 illustrates an exemplary computing device 200 that can be used in the system 100. The computing device 200 may include, for example, one or more servers, workstations, personal computers, laptops, tablets, smartphones, PDAs, terminals, etc. In addition, the computing device 200 may include a single computing device, or it may include multiple computing devices located in close proximity or distributed over a geographic region, so long as the computing devices are specifically configured to function as described herein. In the system 100 of FIG. 1, each of the merchant 102, the acquirer 104, the payment network 106, and the issuer 108 are illustrated as including, or being implemented in, a computing device 200, coupled to (and in communication with) the network 110. In addition, the communication devices 116 and 118 are also consistent with the computing device 200, and may be coupled to (and in communication with) the network 110. That said, however, the system 100, or parts thereof, should not be understood to be limited to the computing device 200, as other computing device may be employed in other system embodiments. In addition, different components and/or arrangements of components may be used in other computing devices.

Referring to FIG. 2, the exemplary computing device 200 includes a processor 202 and a memory 204 coupled to (and in communication with) the processor 202. The processor 202 may include one or more processing units (e.g., in a multi-core configuration, etc.). For example, the processor 202 may include, without limitation, a central processing unit (CPU), a microcontroller, a reduced instruction set computer (RISC) processor, an application specific integrated circuit (ASIC), a programmable logic device (PLD), a gate array, and/or any other circuit or processor capable of the functions described herein.

The memory 204, as described herein, is one or more devices that permit data, instructions, etc. to be stored therein and retrieved therefrom. The memory 204 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable storage media. The memory 204 may be configured to store, without limitation, transaction data, transaction requests, permission requests, authorization profiles, reference biometrics (broadly, reference biometric data), captured biometrics (broadly, captured biometric data), biometric scores, authentication results, and/or other types of data (and/or data structures) suitable for use as described herein. Furthermore, in various embodiments, computer-executable instructions may be stored in the memory 204 for execution by the processor 202 to cause the processor 202 to perform one or more of the functions described herein, such that the memory 204 is a physical, tangible, and non-transitory computer readable storage media. Such instructions often improve the efficiencies and/or performance of the processor 202 that is performing one or more of the various operations herein. It should be appreciated that the memory 204 may include a variety of different memories, each implemented in one or more of the operations or processes described herein.

In the exemplary embodiment, the computing device 200 includes a presentation unit 206 that is coupled to (and that is in communication with) the processor 202 (however, it should be appreciated that the computing device 200 could include output devices other than the presentation unit 206, etc.). The presentation unit 206 outputs information (e.g., permission requests for transactions, indications of transactions being permitted and/or approved/declined, transaction data associated with transactions, etc.), either visually or audibly to a user of the computing device 200, for example, one or more of the users 112 and 114 in the system 100 (e.g., at one or both of the communication devices 116 and 118, etc.), etc. Various interfaces (e.g., as defined by network-based applications, etc.) may be displayed at computing device 200, and in particular at presentation unit 206, to display such information. The presentation unit 206 may include, without limitation, a liquid crystal display (LCD), a light-emitting diode (LED) display, an organic LED (OLED) display, an "electronic ink" display, speakers, etc. In some embodiments, presentation unit 206 includes multiple devices.

The computing device 200 also includes an input device 208 that receives inputs from the user (i.e., user inputs) such as, for example, selections of permission (or authorization) options (e.g., selections of authorizing users and/or devices, etc.), biometric inputs, etc., or inputs from other computing devices. The input device 208 is coupled to (and is in communication with) the processor 202 and may include, for example, a keyboard, a pointing device, a mouse, a stylus, a biometric reader (e.g., a fingerprint reader, a retina scanner, a voice recognition reader, etc.), a touch sensitive panel (e.g., a touch pad or a touch screen, etc.), another computing device, and/or an audio input device. Further, in various exemplary embodiments, a touch screen, such as that included in a tablet, a smartphone, or similar device, behaves as both a presentation unit and an input device.

In addition, the illustrated computing device 200 also includes a network interface 210 coupled to (and in communication with) the processor 202 and the memory 204. The network interface 210 may include, without limitation, a wired network adapter, a wireless network adapter, a mobile network adapter, or other device capable of communicating to/with one or more different networks, including the network 110. Further, in some exemplary embodiments, the computing device 200 includes the processor 202 and one or more network interfaces incorporated into or with the processor 202.

Referring again to FIG. 1, the system 100 includes an authentication engine 120. The authentication engine 120 is shown in FIG. 1 as a standalone part of the system 100, and is generally consistent with computing device 200. Alternatively, and as indicated by the dotted lines in FIG. 1, the authentication engine 120 may be incorporated into (or associated with), in whole or in part, the issuer 108 and/or the payment network 106. In one specific embodiment, for example, the authentication engine 120 is incorporated, in whole or in part, in the payment network 106 (e.g., to facilitate permission requests for purchase transactions performed by transacting users, etc.) and in part in the issuer 108 (e.g., to determine whether permission has been provided/received by/from authorizing users for the purchase transactions, etc.), etc. In addition, the authentication engine 120 is coupled to a profile data structure 122, which may be standalone from the authentication engine 120 or, as indicated by the dotted line, may be incorporated in whole, or in part, with the authentication engine 120. The data structure 122 includes, at the least, an authorization/permission profile for the payment account associated with the authorizing user 114 (and similar profiles for various other users in the system 100).

In addition, in connection with authentication services used herein to authenticate the authorizing user 114 as part of permitting transactions by the transacting user 112 (as will be described in more detail hereinafter), for example, or otherwise, the system 100 includes a merchant plug-in (MPI) 126 associated with the acquirer 104 and an access control server (ACS) 128 associated with the issuer 108. In particular, the ACS 128 is configured to provide enhanced authentication services (e.g., via 3-D Secure protocols, etc.) for use in authenticating the authorizing user 114 (and other users, as appropriate). Each of the MPI 126 and the ACS 128 is in communication with the payment network 106, via one or more network connections such as, for example, network 110, etc. The MPI 126 and the ACS 128 may comprise and/or may be incorporated in any suitable computing devices (e.g., the computing devices 200 associated with the acquirer 104 and the issuer 108, respectively; etc.) and/or may include any protocols (e.g., including, but not limited to, the 3-D Secure protocols, etc.), for example, that take part in authenticating the authorizing user 114 prior to permitting/authorizing purchase transactions by the transacting user 112 to the payment account of the authorizing user 114.

In general in the system 100, the authentication engine 120 is configured to register the payment account of the authorizing user 114, based on one or more inputs from the authorizing user 114 (when the authorizing user 114 desires to make use of the enhanced authentication services described herein). In so doing, the authentication engine 120 compiles an authorization profile for the payment account (and the authorizing user 114), and stores the profile in the data structure 122. As described next, the authorization profile includes various information about the authorizing user 114 and his/her payment account, for example, as solicited from the authorizing user 114 during registration (e.g., a name of the user 114, a mailing address, an email address, a phone number (e.g., associated with the communication device 118, etc.), a payment account number (e.g., the PAN, etc.) for the user's payment account, expiration data, authorized users for the payment account (e.g., the transacting user 112, etc.), etc.).

In particular, for example, when such registration is desired, the authorizing user 114 initially interacts with the issuer 108, via a network-based application 124 provided by the issuer 108 and installed by the authorizing user 114 at the communication device 118 (e.g., a virtual wallet application, etc.), etc., to request to register his/her payment account to the authentication engine 120. In response to the request, via the application 124, the issuer 108 is configured to call an application programming interface, or API, associated with the authentication engine 120 (e.g., upon an input to the application 124 by the user 114 to activate the authorization/authentication services herein, etc.), thereby permitting the authorizing user 114 to interact, indirectly, with the authentication engine 120 (via the issuer 108 and/or the issuer's provided application 124).

In addition in the system 100, as part of the registration, the authentication engine 120, via the API (and/or various interfaces associated therewith), is configured to solicit a reference biometric (broadly, reference biometric data) from the authorizing user 114, such as, for example, a fingerprint, a retina scan, a facial image, a palm scan, or other suitable biometric, etc. (as a reference biometric). The reference biometric, then, can be used subsequently for authenticating the user 114 to the communication device 118, in connection with accessing the application 124 and, in some examples, in connection with permitting/approving transactions to the user's payment account by the transacting user 112. The authorizing user 114, in turn, provides the biometric to the authentication engine 120, via the communication device 118. In addition, the authentication engine 120 is configured to capture and/or solicit an identifier associated with (and generally unique to) the communication device 118, or other communication devices potentially associated with the authorizing user 114. For example, the authentication engine 120 may be configured to capture a media access control (MAC) address of the device 118, when used by the user 114 to contact the authentication engine 120, or request the phone number of the device 118 (when a phone number is associated therewith such as when the device 118 includes a smartphone, for example.). With that said, in generating the authorization profile for the authorizing user 114, it should be appreciated that the authentication engine 120 may be configured to gather different biometrics for different authorizing users of the given payment account and/or for different authorizing users associated with the same communication device 118, as desired (e.g., a second authorizing user, a third authorizing user, etc., all in addition to the authorization user 114).

Then, the authentication engine 120 is configured to store the reference biometric, the identifier, and any other information received from the authorizing user 114 during the registration process in the authorization profile for the user 114, in the data structure 122.

Subsequently in the system 100, after registration of the user's payment account to the authentication engine 120 (and after generation of the authorization profile for the user's payment account), the transacting user 112 may present a payment device associated with the payment account to the merchant 102, for example, to fund a purchase of a product from the merchant 102. In response, the merchant 102 transmits an authorization request for the transaction to the acquirer 104 (and MPI 126), along path A in FIG. 1 (as generally described for the example transaction above between the user 114 and the merchant 102). Upon receipt of the authorization request, the MPI 126 is configured to transmit an authentication message (broadly, a request) to the payment network 106 for the transaction. In turn, the payment network 106 is configured to determine if the issuer 108 associated with the consumer's payment account (as identified based on the PAN for the payment account) is a participant in the enhanced authentication service as described above (e.g., to determine if the authorizing user 114 and/or his/her payment account is registered with the authentication engine 120, etc.). In this example, the issuer 108 is a participant in the authentication service. As such, the payment network 106 is configured to search for the ACS 128 (e.g., an ACS address for the ACS 128, etc.) as associated with the issuer 108 and to transmit the authentication message to the ACS 128.

The ACS 128, then, in response to the authentication message from the MPI 126, is configured to request authentication of the authorizing user 114 associated with the payment account used in the transaction, via the authentication engine 120, as identified based on the PAN for the user's payment account. In so doing, the authentication engine 120 (via the ACS 128) is configured to initially provide a listing of device options to the transacting user 112, from which the transacting user 112 may select for contacting the authorizing user 114 (where the listing is based on data in the authorization profile for acceptable devices). And, the transacting user 112 is configured to transmit the selected option back to the authentication engine 120 (via the ACS 128).

In response, the authentication engine 120 is configured to respond to the authentication message based on the option selected by the transacting user 112, which in this example includes transmitting a request to the authorizing user 114 at the communication device 118 (e.g., via a push message, etc.). The authentication request transmitted to the authorizing user 114 includes a request, generally, for the authorizing user 114 to confirm the transaction (and may include various details of the requested transaction) by supplying a sample biometric (e.g., a fingerprint, etc.) (broadly, biometric data) through the communication device 118 to thereby authenticate the user 114 in connection with the request. Then, when the authorizing user 114 provides the authentication response, the authentication engine 120 is configured to determine whether the user's biometric is valid (when provided). If confirmed, the authentication engine 120 is configured to respond to the ACS 128 indicating the confirmation (or authentication) of the authorizing user 114, and the ACS 128 is configured to respond to the MPI 126 with the confirmation. And, the MPI 126 is configured to permit the transaction (and, specifically, the authorization request for the transaction) to proceed to the payment network 106 and the issuer 108 (e.g., along path A in FIG. 1 for subsequent authorization by the issuer 108, etc.). Conversely, if the biometric is not confirmed, the authentication engine 120 is configured to respond to the ACS 128 indicating that the authorizing user 114 is not authenticated, and the ACS 128 conveys the same to the MPI 126 thereby indicating that permission for the transaction is denied. In such case, the merchant 102, then (e.g., as notified by the acquirer 104, etc.), will not proceed with the transaction.

FIG. 3 illustrates an exemplary method 300 for use in authorizing/permitting a transacting user to fund a purchase transaction with a desired payment account based, at least in part, on authorization/permission from an authorizing user associated with the payment account. The exemplary method 300 is described with reference to the system 100, and with additional reference to the computing device 200. However, the methods herein should not be understood to be limited to the exemplary system 100 or the exemplary computing device 200, and likewise, the systems and the computing devices herein should not be understood to be limited to the exemplary method 300.

At 302 in the method 300, the transacting user 112 initiates a purchase transaction with the merchant 102, for example, by presenting payment account credentials (associated with the payment account described above) to the merchant 102 (e.g., at a network-based application associated with the merchant 102 (e.g., a website, etc.), etc.). In response, the merchant 102 (e.g., via a POS terminal, etc.) compiles an authorization request for the transaction and transmits, at 304, the authorization request to the acquirer 104 and, in particular, the MPI 126 associated therewith in this example.

In turn, the ACS 128 receives the authentication message, at 308, and, based on the PAN for the payment account identified in the authentication message (and as included in the authorization request), identifies the payment account to the authentication engine 120. The authentication engine 120 then retrieves, at 310, the authorization profile for the payment account from the data structure 122. The authorization profile, in this exemplary embodiment, includes an identification of the authorizing user 114 and the communication device 118 associated with the authorizing user 114. In addition, the authorization profile includes identification of additional users that may authorize the transaction (e.g., "other authorizing users", etc.) and/or other communication devices at which/from which the authorizing user 114 and/or the other authorizing users may provide the request permission for the transaction to proceed (e.g., "other communication devices", etc.). It should be appreciated that any desired number and/or combination of authorizing users and/or communication devices may be included in the authorization profile.

Next, the authentication engine 120 identifies, at 312, device options (e.g., a single device option, multiple device options, etc.) for the transaction from the authorization profile for the payment account. The authentication engine 120 then transmits the device option(s) to the ACS 128 for display to the transacting user 112, at 314 (e.g., via computing device 200, etc.). In connection therewith, the device option(s) are displayed to the transacting user 112 at the computing device being used to request the transaction (e.g., the consumer's communication device 116 (where the communication device 116 may be identified to the ACS 128 based on an address included in the transaction data for the transaction, etc.), a computing device associated with the merchant 102, etc.). At 316, the transacting user 112 selects the desired device option, and the selection is transmitted, at 318, back to the authentication engine 120, via the ACS 128 (thereby requesting the authentication engine 120 to solicit authentication from the authorizing user 114 on the selected device via a push message).

FIG. 4 illustrates an exemplary interface 400, which may be used to display the device option(s) to the transacting user 112 (in connection with requesting permission for the given transaction). As shown, the interface 400 includes options at 402 from which the transacting user 112 can select and through which the authorizing user 114 may then provide authentication for the transaction. While in this example the interface 400 includes a listing of devices from which authentication of the authorizing user 114 may be requested, it should be appreciated that other interfaces may include other options such as other listings of devices, other permissions, or other interfaces all together, etc.

With reference again to FIG. 3, an authentication request is next transmitted, at 320, by the authentication engine 120, potentially via the ACS 128 (even though not expressly illustrated in FIG. 3), to the authorizing user 114 for the given transaction, at the selected communication device 118 (via the application 124). The authentication request includes a request for the authorizing user 114 to capture a sample biometric for use in authenticating the user 114. For example, the authentication request may include a request for the authorizing user 114 to capture a biometric, such as his/her fingerprint or facial image (e.g., selfie, etc.), through the communication device 118 (e.g., via the application 124, etc.). Further, the authentication request will generally include some detail about the underlying transaction for which permission is being requested, such as a name of the merchant 102, an amount of the transaction, a description of the product, etc. The authorizing user 114 then responds to the authentication request, at 322, by providing the requested biometric. Alternatively, the authorizing user 114 may not respond to the request, in which case, following a defined time period (e.g., one minute, two minutes, five minutes, 30 minutes, etc.), the lack of response is considered a response (either an approval or a decline, depending on preferences in the authorization profile, for example).

Next in the method, at 324, the authentication engine 120 (potentially upon receiving the response from the ACS 128, even though not expressly illustrated in FIG. 3) determines whether the response from the authorizing user 114 (or lack of response) is a confirmed authentication of the user 114 (e.g., as an initial or preliminary authorization of the transaction by the authorizing user 114, etc.). This includes determining if the sample biometric (if provided) matches a reference biometric for the authorizing user 114 as retrieved from the data structure 122. For example, when the sample biometric matches (or substantially matches) the reference biometric data for the authorizing user 114, as will be understood by one skilled in the art (based on suitable matching algorithms, etc.), the authentication engine 120 authenticates the user 114. In turn, the authentication engine 120 confirms the authentication request, and the corresponding granted permission for the transaction. It should be appreciated that the authentication engine 120 may confirm the response from the authorizing user 114 in this manner, or not confirm the response (as appropriate), regardless of the form or content of the response (e.g., regardless of the biometric provided in the response, etc.).

When the given transaction is authenticated by the authorizing user 114 (e.g., based on authentication of the authorizing user 114, based on a default preference with no authentication is provided, etc.), the authentication engine 120 responds to the ACS 128, at 326, indicating that the authorizing user 114 is authenticated (and that permission for the transaction has been provided) (e.g., transmits an appropriate notification to the ACS 128, etc.). In response, the ACS 128 confirms, at 328, with the MPI 126 that the authorizing user 114 is authenticated (e.g., transmits an authentication reply in response to the authentication message, etc.), and the MPI 126 causes the authorization request for the underlying transaction (as performed by the transacting user 112) to be transmitted, at 330, to the issuer 108 (via the payment network 106, as indicated above in the system 100). The issuer 108 then reviews the transaction, as is conventional (as a subsequent authorization review of the transaction), and transmits an authorization reply back to the merchant 102, at 332 (as generally described above in the system 100 in connection with the example transaction at the merchant 102), with the appropriate content, such as, for example, transaction approved or transaction declined. Then, at 334, the merchant 102, depending on the content of the authorization reply, is able to continue in the transaction with the transacting user 112, or terminate the transaction, as appropriate.

Conversely in the method 300, when the authorizing user 114 is not authenticated (and the given transaction is not permitted by the authorizing user 114), at 324, the authentication engine 120 responds to the ACS 128, at 336, indicating that the authorizing user 114 is not authenticated. In turn, the ACS 128 notifies the MPI 126, at 338, that the authorizing user 114 is not authenticated, and the MPI 126 responds to the merchant 102, at 340, indicating that permission for the transaction has not been provided. Then, again, at 334, the merchant 102 is able to terminate the transaction.

In view of the above, the systems and methods herein permit multiple different users to potentially perform purchase transactions to the same payment accounts while allowing authorizing users of the payment accounts to still maintain control over the payment accounts. For example, an authentication engine is configured to map a payment account for an authorizing user to a unique profile, and then link various devices thereto (either associated with the user or associated with other different users authorized to use the payment account). The authorizing user is then allowed to associate authentication (e.g., biometric authentication, etc.) of transactions to the payment account with the various linked devices. In this manner, an additional layer of authentication and/or authorization may be provided to the transactions, by the authorizing user, prior to the transactions being completed. What's more, in a similar manner, multiple payment accounts may be associated with a single one of the devices, thereby allowing multiple different users to enroll on a single device. With that said, and as described herein, through the unique features of the present disclosure, authorization of transactions deviate from that of conventional transactions to provide both flexibility to users of the payment account and enhanced security, such that the authorizing user directly associated with the payment account may be reassured that the given transactions are proper and/or acceptable (but still be readily authenticated and/or authorized).

Again and as previously described, it should be appreciated that the functions described herein, in some embodiments, may be described in computer executable instructions stored on a computer readable media, and executable by one or more processors. The computer readable media is a non-transitory computer readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one of the following operations: (a) receiving a message associated with a transaction to a payment account, the transaction initiated by a first user; (b) retrieving an authorization profile for the payment account based on a primary account number for the payment account, the authorization profile including at least one communication device associated with a second user, the second user associated with the payment account; (c) soliciting from the first user, a selection of the at least one communication device; (d) in response to the selection of the at least one communication device by the first user, transmitting an authentication request for the transaction to the second user at the selected at least one communication device, thereby permitting the second user to grant permission for the transaction to the payment account; (e) determining whether the second user authorizes the transaction based on a response from the at least one communication device indicating a grant of permission for the transaction; and (f) responding to an issuer associated with the payment account confirming that the transaction is allowed when the second user is determined to authorize the transaction, thereby permitting the issuer to generate an authorization reply for the transaction; (g) receiving the selection of the at least one communication device from the first user via a merchant involved in the transaction; and (h) registering the second user and the at least one communication device to the authorization profile.

Exemplary embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" includes any and all combinations of one or more of the associated listed items.

In addition, as used herein, the term product may include a good and/or a service.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for use in processing transactions to payment accounts by first transacting users, based on authentication of second designated users associated with the payment accounts and different from the transacting users, the method comprising:

receiving, at a computing device, a message associated with a transaction to a payment account, the transaction initiated by a first user;

retrieving an authorization profile for the payment account from a data structure based on a primary account number for the payment account, the authorization profile including a communication device associated with a second user, the second user associated with the payment account;

soliciting, by the computing device, from the first user, a selection of a device option for use in authenticating the first user, from a listing of multiple device options included in the authorization profile for the payment account, wherein the listing of device options includes the communication device associated with the second user; and in response to the selection of the device option specific to the communication device, by the first user, transmitting an authentication request for the transaction to the second user at the selected communication device, thereby permitting the second user to grant permission for the transaction to the payment account, or not.

2. The computer-implemented method of claim 1, further comprising:

receiving, by the computing device, a response from the second user to the authentication request; and confirming permission for the transaction based on the response.

3. The computer-implemented method of claim 2, wherein the response includes biometric data for the second user; and wherein confirming permission for the transaction based on the response includes confirming the transaction based on the biometric data included in the response.

4. The computer-implemented method of claim 3, further comprising:

retrieving reference biometric data from the authorization profile for the payment account; and comparing the biometric data included in the response to the reference biometric data retrieved from the authorization profile;

wherein confirming permission for the transaction includes confirming permission for the transaction when the biometric data included in the response matches or substantially matches the reference biometric data.

5. The computer-implemented method of claim 2, wherein confirming permission for the transaction includes transmitting an indicator of the permission to an access control server (ACS) associated with an issuer of the payment account, whereby the issuer is able to approve or decline the transaction.

6. The computer-implemented method of claim 1, wherein the first user is a minor child, and the second user is a guardian of the minor child.

7. The computer-implemented method of claim 1, further comprising receiving, by the computing device, the selection of the device option specific to the communication device from the first user.

8. The computer-implemented method of claim 7, wherein soliciting a selection of a device option includes causing an interface to display to the first user comprising a listing of the multiple device options, each of the multiple device options specific to one of multiple communication devices.

9. The computer-implemented method of claim 8, wherein at least one of the multiple communication devices is associated with a third user.

10. The computer-implemented method of claim 9, further comprising, in response to selection of the device option specific to the communication device associated with the third user, by the first user, transmitting another authentication request for the transaction to the third user at the selected communication device associated with the third user, thereby permitting the third user to grant permission for the transaction to the payment account, or not.

11. The computer-implemented method of claim 1, wherein receiving a message associated with a transaction to a payment account includes receiving the message from an access control server (ACS) associated with an issuer of the payment account; and wherein transmitting an authentication request for the transaction to the second user at the selected communication device includes transmitting the authentication request to the second user via the ACS.

12. A system for use in processing transactions to payment accounts by first transacting users, based on permission by second designated users associated with the payment accounts and different from the transacting users, the system comprising an authentication engine having a memory and being in communication with an issuer of a payment account, the memory including multiple authorization profiles, the authentication engine configured to:

retrieve one of the authorization profiles from the memory for the payment account, in response to an authentication message for a transaction by a first user and involving the payment account, the payment account associated with a second user;

solicit, from the first user, a selection of a device option from a listing of at least one device option included in the authorization profile;

identify, based on the selection of the device option, a communication device for the transaction in the retrieved authorization profile for use in soliciting permission for the transaction; and transmit an authentication request to the identified communication device to solicit the permission for the transaction, prior to approval or decline of the transaction by the issuer of the payment account.

13. The system of claim 12, wherein the at least one device option included in the authorization profile includes a plurality of device options;

wherein the authentication engine is configured, in connection with identifying a communication device, to identify, based on selection by the user of multiple ones of the plurality of device options, multiple communication devices for the transaction in the retrieved authorization profile; and wherein, in connection with transmitting an authentication request, the authentication engine is configured to transmit the authentication request to each of identified multiple communication devices.

14. The system of claim 12, wherein, in connection with soliciting the selection of the device option from the listing of the at least one device option, the authentication engine is configured to cause an interface to display to the first user comprising a listing of the at least one device option.

15. The system of claim 12, wherein the authentication engine is configured to:

determine that a reply to the authentication request, from the identified communication device, includes the permission for the transaction to proceed; and to respond to the issuer of the payment account indicating the permission for the transaction to proceed.

16. The system of claim 15, further comprising the issuer; and wherein the issuer is configured to identify the transaction to the authentication engine when the payment account is registered to the authentication engine.

17. The system of claim 16, wherein the issuer is further configured to respond to an acquirer associated with the transaction, indicating the permission for the transaction to proceed as received from the authentication engine.

18. The system of claim 17, wherein the issuer is further configured to transmit an authorization reply for the transaction either approving or declining the transaction, in response to an authorization request from the acquirer associated with the transaction, after the authentication engine indicates the permission for the transaction to proceed.

19. A non-transitory computer-readable storage media including executable instructions for processing transactions to payment accounts, which, when executed by a processor, cause the processor to:

receive a message associated with a transaction to a payment account, the transaction initiated by a first user and the payment account associated with a second user;

retrieve an authorization profile for the payment account, from a data structure, in response to the message and based on a primary account number for the payment account;

identify multiple communication devices, for the transaction, in the retrieved authorization profile for use in soliciting permission for the transaction, at least one of the multiple communication devices associated with the second user;

solicit a selection of one of the multiple communication devices from the first user, from a listing of the multiple communication devices presented to the first user; and transmit an authentication request to the selected one of the multiple communication devices to solicit the permission for the transaction, prior to approval or decline of the transaction by an issuer of the payment account.

20. The non-transitory computer-readable storage media of claim 19, wherein the executable instructions, when executed by the processor, further cause the processor to:

determine that a reply to the authentication request, from the selected one of the communication devices, includes the permission for the transaction to proceed; and respond to the issuer of the payment account indicating the permission for the transaction to proceed, whereby the issuer receives an authorization request for the transaction from an acquirer associated with a merchant involved in the transaction.

* * * * *